E. M. WHITE.

SPLASH SYSTEM OF LUBRICATION.

APPLICATION FILED JAN. 15, 1913.

Reissued Nov. 18, 1913. 13,651.

Witnesses—
Charles H. York
Wills A. Burones

Inventor—
Ernest M. White
by his Attorneys—
Howson & Howson

UNITED STATES PATENT OFFICE.

ERNEST M. WHITE, OF GLOBE, ARIZONA.

SPLASH SYSTEM OF LUBRICATION.

13,651. Specification of Reissued Letters Patent. Reissued Nov. 18, 1913.

Original No. 1,030,1[illegible]3, dated June 18, 1912, Serial No. 669,308. Application for reissue filed January 15, 1913. Serial No. 742,286.

*To all whom it may concern:*

Be it known that I, ERNEST M. WHITE, a citizen of the United States, and a resident of Globe, Gila county, State of Arizona, have invented certain Improvements in Splash Systems of Lubrication, of which the following is a specification.

One object of my invention is to provide a novel construction and arrangement of parts adapted for use in connection with engines, especially of the internal combustion type, whereby the act of adjusting the throttle of the engine shall cause a corresponding adjustment of a lubricant regulating device in order that the amount of lubricant in active circulation shall be varied with and in proportion to the amount of work done by the engine.

Another object of my invention is to provide a novel device particularly adapted for use in connection with a splash system of lubrication and having connection with the throttle of the engine, whereby the adjustment of said throttle to vary the flow of fuel to the engine shall in addition cause a greater or less amount of lubricant to be put into active circulation in order to meet the varied conditions resulting from such throttle adjustment; it being especially desired that the device shall be relatively simple, inexpensive and of such a nature as not easily to get out of order.

These objects and other advantageous ends I secure as hereinafter set forth, reference being had to the accompanying drawings, in which:—

Figure 1:
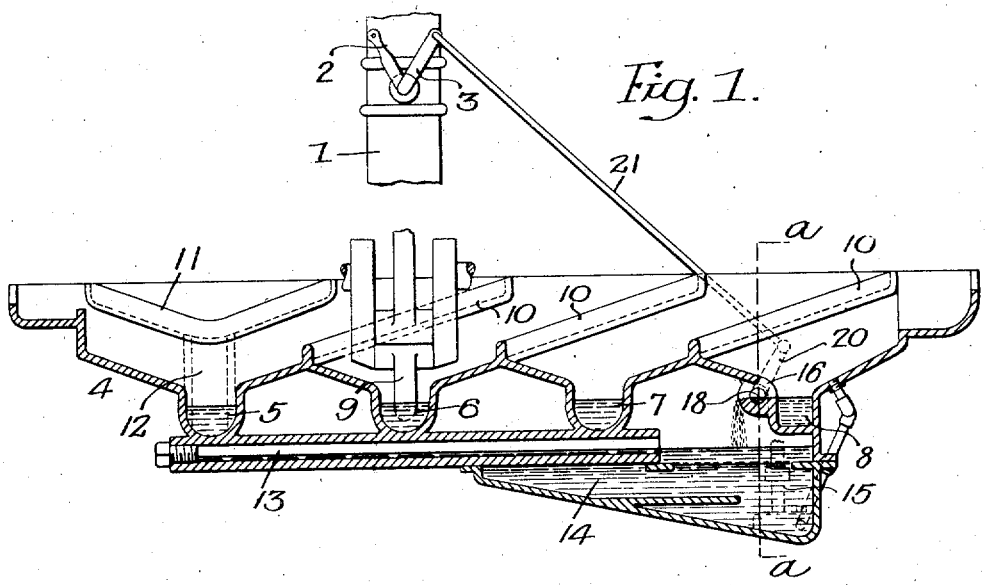
Figure 2:
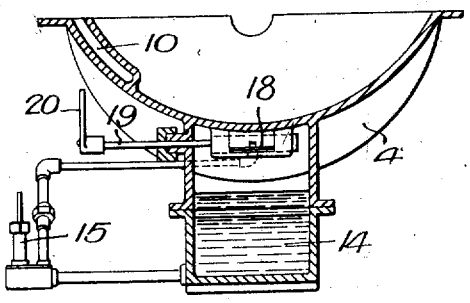

Figure 1, is a vertical section to some extent diagrammatic, illustrating my invention as applied to the crank case of an internal combustion engine; Fig. 2, is a transverse vertical section on the line *a—a*, Fig. 1; and Fig. 3, is an enlarged vertical section further illustrating my invention.

In the above drawings 1 represents a portion of the fuel-supply device or conduit of an internal combustion engine, in which is mounted a throttle valve having an operating arm 2 and a second arm 3 hereinafter referred to. The crank case 4 of the engine, which, in this instance, is of the four-cylinder type, is provided with partitions forming four transversely extending lubricant containers 5, 6, 7 and 8 lying respectively in and adjacent the planes of rotations of the four connecting rods of the engine. The crank end of each of these rods is provided with an extension 9 designed to enter its particular reservoir, and the bottom of the crank case is so arranged that portions thereof on both sides of each reservoir slope toward or into the same.

The one side of the crank case immediately adjacent each of the reservoirs is provided with inclined gutters 10 and each gutter adjacent a given reservoir is so arranged as to collect a portion of the oil splashed up by the connecting rod extension 9 from said reservoir and to discharge such oil into one of the reservoirs next adjacent to it. In the case of the reservoir 5, the gutter adjacent thereto has the form indicated at 11 and consists of two portions draining to a common point from whence as shown in dotted lines in Fig. 1, the conduit 12, leads usually outside of the crank case, to a pipe 13 which discharges into a storage tank 14. Any suitable form of pump 15 has its intake connected to this tank and its outlet arranged to discharge into the reservoir 8.

Figure 3:
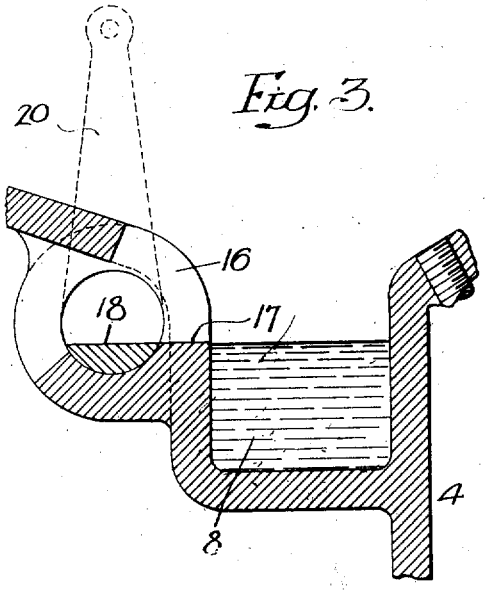

As well shown in Fig. 3, this particular reservoir 8 is provided with what may be described as an adjustable weir, *i. e.*, there is in one of its sides an opening 16 having a substantially level bottom edge 17 over which the liquid above a predetermined amount entering the reservoir 8 is free to flow into the storage tank 14. Immediately adjacent said edge, however, I mount an adjustable piece 18 having in the present case the form of an elongated cylindrical segment and mounted on a rod 19 carried in a suitable bearing in the crank case or other supporting structure so as to be rotatable. Said rod is provided with a stuffing box where it passes through the side of the crank case and is provided with an arm 20 connected by a link 21 with the arm 3 which as before noted, is attached to the throttle valve and to the arm 2 whereby this latter is actuated. The adjustable piece 18, which serves as a valve, is of such proportions and is so placed that when the arm 20 is in the position shown its plane face lies at the level or in the same plane as the overflow edge 17. Owing to the fact that this plane face of the valve or adjustable weir does not intersect the line about which it is rotatable, a movement of the rod 20 in one direction raises that edge of said valve which is adjacent the reservoir 8 and thus requires the accumulation in said reservoir of a body of lubricant greater than that which would ordinarily be retained.

Under operating conditions, the arm 20 is so connected to the arm 2 of the engine throttle valve that when said valve is in a position to cause the engine to operate under normal conditions, the valve or weir 18 is in the position shown in Fig. 3. Consequently, the operation of the pump 15 maintains the lubricant in the reservoir 8 at the level shown and the splashing up of said lubricant by the parts 9 of the connecting rod operating therein, causes a certain part of the oil from this reservoir to flow into the gutters 10 adjacent thereto so that it passes to the reservoir 7. As long as the engine is working under normal conditions, the level of lubricant in this reservoir remains at a very definite height sufficient to cause proper lubrication of the engine parts and at the same time the oil splashed up from this reservoir by the connecting rod is passed by the gutter adjacent thereto to the reservoir 6 and so on. Thus, a predetermined and suitable supply of oil is provided and its level in the reservoir 8 is maintained at a predetermined point, since the surplus supplied by the pump 15 would be immediately discharged into the storage tank 14 over the weir edge 17 and the valve 18. If, now, the throttle valve of the engine be further opened in view of an increased load or in order to obtain an increase of the speed, the valve or weir 18 is so turned through the link 21 and the arm 20, as to prevent the flow of oil from the reservoir 8 until the amount therein has been increased to such a height as to permit of it overflowing the raised edge of the said valve 18; it being of course understood that the pump 15 is at all times operated at a speed necessery to raise the level of lubricant in this tank in spite of the action of the engine in removing it from the same.

As is obvious to one skilled in this art, the movement of the throttle valve from its normal running position indicated in Fig. 1, toward its closed position, will necessarily also turn the valve of weir 18 so as to raise the level of oil in the reservoir 8 with the results hereafter noted.

As a consequence of the increased height of lubricant in the reservoir 8, a larger quantity of oil is splashed up by the connecting rod operating therein and this increased amount passes to the succeeding reservoirs—each of which is thus provided with an abnormal amount of oil, so that the engine, as a unit, has in active circulation the greater amount of lubricant required by the increase of load. The oil from the reservoir 5 passes from the trough 11, through the conduit 12 and the pipe 13 back to the storage tank 14.

The return of the throttle to its normal open position likewise causes the adjustable weir to be brought back to the position shown in Fig. 3, thus lowering the level of lubricant in the reservoir 8 and causing a corresponding falling off in the amounts in the other reservoirs.

I claim.

1. A lubricating device consisting of an oil container having an overflow opening; a movable member for taking oil from said container; means for supplying oil to the container; with means for varying the position of the bottom edge of the overflow opening to vary the depth of oil in the container.

2. The combination of an oil reservoir having an overflow opening; a member periodically entering the reservoir for removing the oil therefrom; means for supplying oil to the reservoir faster than it is removed therefrom by said member; and means for adjusting the overflow to vary the depth of oil in the reservoir.

3. The combination with the throttle of an engine, of a fixed oil reservoir; a movable member mounted to enter the reservoir for removing oil therefrom; means for supplying oil to the reservoir; and a device for varying the depth of oil in the reservoir operatively connected to the throttle so as to be adjustable therewith.

4. The combination with the throttle of an engine, of an oil reservoir having an overflow opening provided with an adjustable member for varying the depth of oil in said reservoir; means for connecting said member with the engine throttle to cause it to be adjusted with said throttle; and means for supplying oil to the reservoir.

5. The combination of an engine crank case having a series of reservoirs formed to be entered respectively by portions of the engine; means for transmitting to certain reservoirs the oil splashed up from other reservoirs; a storage reservoir connected to an end one of said reservoirs; means for delivering oil from the storage reservoir to the other end reservoir; said last reservoir having an overflow opening discharging into the storage reservoir; and means for adjusting the depth at which the oil in said last reservoir discharges through said overflow opening.

6. The combination of a crank case having a series of oil reservoirs respectively entered by moving parts of the engine; means for delivering oil splashed up from certain of the reservoirs into adjacent reservoirs; a storage reservoir connected to receive oil splashed up from an end one of said reservoirs; means for delivering oil from the storage reservoir to the other end reservoir; said latter reservoir having an overflow provided with an adjustable structure for varying the depth of oil therein; a throttle for the engine; and means for operatively connecting said throttle with the said adjustable structure.

7. The combination of engine controlling means; a fixed reservoir placed to be entered by a portion of a connecting rod of the engine; and means for varying the depth of oil in the reservoir, said latter means being connected to the engine controlling means.

8. The combination with the fuel supply conduit of an engine, of a throttle in said conduit; an oil supply system for said engine including a reservoir; a valve for controlling the flow from said reservoir mounted to raise the level of oil in the latter when moved in either of two directions from a neutral position; and a member connecting said valve and the throttle.

9. The combination in an engine of a crank case having a main oil reservoir and a series of auxiliary reservoirs, the latter being respectively in positions to be entered by the connecting rods of the engine; means for supplying oil from the main reservoir to one of said auxiliary reservoirs; and means for causing the oil splashed up from one auxiliary reservoir to be passed through all the others, one of the auxiliary reservoirs having an overflow discharging into the main reservoir.

10. The combination in an engine oiling system of a main oil container; auxiliary oil containers placed to be respectively entered by moving parts of an engine and having a level determining overflow to the main container; conduits for causing oil splashed up from each auxiliary container by a moving engine part to be passed to another auxiliary container; and means for delivering oil from the main container to the auxiliary containers.

11. The combination of a crank case; a main oil container; auxiliary oil containers of which one has an overflow to the main container; conduits for causing oil splashed from said latter auxiliary container to flow into another auxiliary container and then to the main container; with means for causing oil to flow from said main oil container to that auxiliary container having the overflow.

12. The combination of a crank case provided with a main container; a series of auxiliary containers in said crank case placed to be respectively entered by moving parts of the engine, there being an overflow from one of the auxiliary containers to the main container; trough on the wall of the crank case placed to direct oil splashed up from one auxiliary container to another; and means for forcing oil from the main container to one of the auxiliary containers.

13. The combination in an engine oiling system of main and auxiliary containers; conduits for delivering oil splashed up from certain of the auxiliary containers to another auxiliary container; a pump for transferring oil from the main container to one of the auxiliary containers; and a conduit for delivering to the main container the oil splashed up from one of the auxiliary containers.

14. The combination in an engine oiling system of a main and a series of auxiliary containers, one of said latter containers having an overflow to the main container; means for transferring oil from the main container to said first auxiliary container; conduits for delivering oil splashed up from certain of the auxiliary containers to other auxiliary containers; and a conduit for delivering to the main container the oil splashed up from the last auxiliary container of the series.

15. The combination of a crank case having a main container; a series of auxiliary containers in said crank case placed above the main container in positions to be respectively entered by moving parts of an engine, there being an overflow from one of the auxiliary containers to the main container; troughs on the wall of the crank case placed in position to direct oil splashed up from certain auxiliary containers to others; means for transferring oil from the main container to that auxiliary container having said overflow; and a conduit for returning to the main container, the oil splashed up from the last auxiliary container of the series.

16. The combination of a crank case provided with a series of auxiliary containers placed to be respectively entered by moving parts of an engine; a main container below said auxiliary containers; troughs on the wall of the crank case placed to direct oil splashed from one auxiliary container to others; means for transferring oil from the main container to the first auxiliary container; a conduit for returning to the main container oil delivered to the first of the auxiliary containers; and means for conveying to the main container the oil splashed up from the last auxiliary container.

In testimony whereof, I have signed my name to this specification, in the presence of two subscribing witnesses.

ERNEST M. WHITE.

Witnesses:
H. H. Pratt,
R. H. Harpham.